(12) United States Patent
Warren et al.

(10) Patent No.: US 7,704,304 B2
(45) Date of Patent: Apr. 27, 2010

(54) PROCESS AND APPARATUS FOR GENERATING AND DELIVERING AN ENRICHED GAS FRACTION

(75) Inventors: John L. Warren, Kelowna (CA); Anthony Hiscock, Kelowna (CA)

(73) Assignee: Wearair Oxygen, Inc., British Columbia (CA)

( * ) Notice: Subject to any disclaimer, the term of this patent is extended or adjusted under 35 U.S.C. 154(b) by 0 days.

(21) Appl. No.: 12/369,166

(22) Filed: Feb. 11, 2009

(65) Prior Publication Data

US 2009/0145300 A1      Jun. 11, 2009

Related U.S. Application Data

(62) Division of application No. 11/475,357, filed on Jun. 27, 2006, now Pat. No. 7,491,261.

(60) Provisional application No. 60/693,920, filed on Jun. 27, 2005.

(51) Int. Cl.
    *B01D 53/04* (2006.01)
(52) U.S. Cl. .............................. 96/114; 96/116; 96/152
(58) Field of Classification Search ........... 96/113–116, 96/121, 139, 152; 95/19, 22, 96, 130; 128/204.21, 128/205.12
    See application file for complete search history.

(56) References Cited

U.S. PATENT DOCUMENTS

| | | | | |
|---|---|---|---|---|
| 5,112,367 A | * | 5/1992 | Hill | 95/98 |
| 5,549,736 A | * | 8/1996 | Coffield et al. | 96/133 |
| 5,827,358 A | * | 10/1998 | Kulish et al. | 96/115 |
| 6,068,680 A | * | 5/2000 | Kulish et al. | 95/98 |
| 6,478,850 B1 | * | 11/2002 | Warren | 95/21 |
| 6,547,851 B2 | * | 4/2003 | Warren | 95/21 |
| 7,491,261 B2 | * | 2/2009 | Warren et al. | 95/96 |
| 2004/0050255 A1 | * | 3/2004 | Simonds | 96/109 |
| 2009/0229459 A1 | * | 9/2009 | Warren et al. | 95/54 |

* cited by examiner

*Primary Examiner*—Frank M Lawrence
(74) *Attorney, Agent, or Firm*—Mueller Smith & Okuley, LLC

(57) ABSTRACT

An improved sieve bed design to manage breakthrough and the mass transfer zone by way of volumetric division. An empty space in the product end is separated from adsorbent-filled sieve space in the feed end by a mid-diffuser plate. The ratio of the empty product end void space to the adsorbent filled sieve space within a sieve bed may be determined by the relative percentages of the gasses to be separated and the bulk loading factor of the molecular sieve. A product end void space of the correct volume may ensure the maximum volume of nitrogen has been adsorbed before breakthrough occurs. In operation, pressure in the sieve bed empty space and sieve filled space may be equal at any instant. This contains breakthrough to the location of the mid-diffuser plate. The mass transfer zone may be static at the point of the mid-diffuser plate and as such, gas separation is a function of pressure within the bed.

10 Claims, 10 Drawing Sheets

PROCESS AND APPARATUS FOR GENERATING AND DELIVERING AN ENRICHED GAS FRACTION

CROSS-REFERENCE TO RELATED APPLICATIONS

This application is a division of U.S. patent application Ser. No. 11/475,357, filed Jun. 27, 2006 now U.S. Pat. No. 7,491,261, which claims the benefit of Provisional Application No. 60/693920 filed Jun. 27, 2005.

FIELD OF THE INVENTION

This invention relates to the field of gas concentrators and gas conserving devices.

BACKGROUND OF THE INVENTION

The process of pressure swing adsorption (PSA) to enrich the concentration of a gas, such as the oxygen concentration, is known in the prior art. The challenge has been to generate sufficient quantities or flow rates of the enriched gas, in a sufficiently high concentration, to enable the therapeutic use of a PSA machine. A further challenge has been to make such a machine portable, that is relatively small and lightweight, self-sufficient, and self contained for realistic portability by a patient over an extended period of time.

It is also known in the prior art to attempt to conserve the target gas using an oxygen conserving device (OCD), that is, conserve the use of for example high concentration oxygen by a patient so as to pro-long the supply of the target gas from. Thus in one aspect of the present invention, it may be advantageous to combine a target gas concentrator, for example, an oxygen concentrator, with an OCD to enhance the duration of supply of the enriched gas from the gas concentrator, thereby enhancing the self sufficiency of both the device and patient.

As known in the prior art, oxygen is prescribed for patients suffering from chronic obstructive pulmonary disorder (COPD). By way of background, the practice of providing oxygen to COPD patients is known as long-term oxygen therapy (LTOT). The oxygen cylinders conventionally provided to patients for therapeutic use are typically large and heavy. Smaller, lighter cylinders are available but have a limited duration of oxygen flow.

Oxygen conserving devices were introduced which enabled cylinders to deliver sufficient oxygen for greater periods of time by only providing oxygen when the patient would inspire. In those devices, a fixed volume of oxygen is delivered, at a high flow rate, to the patient upon detection of inspiration. The volume of oxygen delivered per breath to the patient, per setting, is claimed to produce the same blood oxygen concentration in the patient as a continuous flow device at the same setting.

An oxygen-conserving ratio can be defined based on the volume delivered to the patient by a continuous flow oxygen system, at any given setting, compared to the volume delivered by the OCD. There are two common fixed ratios, 3:1 and 6:1. A doctor may find that a particular patient at rest will have sufficiently high blood oxygen concentration for a given pulse dose as metered by the OCD at a particular setting. However, if the patients' oxygenation requirements increase as a consequence of physical activity, increasing the amount of oxygen metered based on a fixed ratio pulse dose may not be effective. It could be that the patient requires more oxygen than the conserving device will supply to maintain blood oxygenation. To compensate for this a doctor may choose to prescribe the highest setting. This of course would then not be the most efficient use of oxygen.

The patient inspiration is detected by the OCD when a partial vacuum is produced in the nasal cannula. If breathing occurs partially through the mouth, such as when a patient is sleeping, the vacuum in the nasal cavity may be too shallow to be detected by the sensor. Increasing the sensitivity of the sensor introduces a new problem of possible false inspiration detection whenever the cannula is bumped, as a result of the differential pressure created within the cannula as it shakes.

In the field of gas concentrators it is known to use zeolite to adsorb nitrogen in an oxygen concentrator. The use of zeolite herein is intended to be exemplary. It would be known to one skilled in the art to tailor the use of a specific adsorbent, whether a particular type of zeolite or other adsorbent. As is known in the prior art, zeolite consists of molecular sized polyhedral cages. Oxygen and nitrogen molecules (for example) can access the inside of these cages through holes in the crystalline structure. The crystalline structure contains cations. Gas adsorption occurs when molecules are attached to these cations through electrostatic forces. Nitrogen molecules bind stronger to the zeolite cations than oxygen molecules. As a result, if a mixture of nitrogen and oxygen, such as found in atmospheric air, is pressurized into a chamber full of zeolite particles, nitrogen will adsorb into the zeolite particles more readily than oxygen. There will be a higher concentration of oxygen in the empty space between the zeolite particles, (hereinafter referred to as zeolite void space), than there was in the original gas mixture.

A conventional pressure swing adsorption gas separation cycle in an oxygen concentrator works as follows:

(a) A first cylindrical zeolite filled chamber is pressurized from the feed end with atmospheric air, while oxygen enriched gas exits from the product end through a gas flow restrictor.

(b) The oxygen enriched gas flow passes through a conduit junction. A portion of the oxygen-enriched gas is delivered for end use. The remaining portion of the oxygen-enriched gas travels through the product end of a second cylindrical zeolite chamber and is vented to atmosphere from a vent located at the feed end of the chamber. This gas flow is counter current to the direction of pressurization of the second chamber, (hereinafter referred to as counter flow), to push nitrogen out of the second chamber.

(c) The second zeolite filled chamber is pressurized from the feed end with atmospheric air, while oxygen enriched gas exits from the product end through a gas flow restrictor.

(d) The oxygen enriched gas flow passes through the conduit junction. A portion of the oxygen-enriched gas is delivered for end use. The remaining portion of the oxygen enriched gas travels through the product end of the first chamber and is vented to atmosphere from a vent located at the feed end of the chamber. This gas flow is counter current to the direction of pressurization of the first chamber to push nitrogen out of the first chamber.

The cycle is then repeated.

During oxygen enriched gas generation nitrogen is left adsorbed into the zeolite particle structure. A conventional approach to removing the nitrogen from the chamber is to blow oxygen enriched gas across the zeolite from the product end of the chamber to the feed end of the chamber. This counter-flow pushes nitrogen gas, as a wave, to the feed end of the zeolite chamber and out the vent to the atmosphere. Since nitrogen is strongly bound to the zeolite cations, it takes a large quantity of oxygen enriched gas flow in conjunction with depressurization to remove it. Another method to remove the nitrogen from the zeolite chamber is to evacuate the chamber with a vacuum pump.

Conventional PSA sieve bed design thus provides for the flow of gas through a sieve bed from the inlet or feed end to the outlet or product end. The sieve beds are completely filled with molecular sieve. A calibrated orifice at the product end provides resistance to the flow of gas through the sieve bed. This resistance to flow provides the necessary pressurization of the sieve bed to facilitate nitrogen adsorption by the molecular sieve. The bed is pressurized for a period of time, which corresponds to the propagation of the mass transfer zone through the bed. The mass transfer zone is a build up of nitrogen, which moves as a front from the feed end of the bed to the product end of the bed. The mass transfer zone moves as a consequence of gas flow through the bed, but may propagate independently of the gas flow. The point at which the mass transfer zone reaches the outlet (product end), where any further pressurization will result in high concentrations of nitrogen leaving the product end, is referred to as "breakthrough".

By way of analogy, when humid air is introduced into one end of a dry desiccant filled cylinder, the desiccant incrementally soaks up the water vapor in the air. As a result, the gas that has passed through the desiccant bed is dryer than the gas that entered it. Water is adsorbed first by the first available desiccant particles that appear in the flow stream. Thus the desiccant near the entrance of the desiccant filled cylinder will be filled with water vapor well before the desiccant near the exit of the cylinder. As the total volume of humid air that has passed through the desiccant increases, the volume of the desiccant filled with water increases from the feed end of the cylinder to the exit of the cylinder. Eventually the desiccant that is near the exit of the cylinder is filled with water as well. At this point, no more water vapor can be adsorbed. If more water vapor is added after this point, the water vapor will just pass straight through the desiccant filled cylinder. This is an example of "breakthrough". Likewise, for any given pressure, a molecular sieve material such as zeolite can only adsorb a finite volume of nitrogen before breakthrough occurs.

Although applicants do not wish to be held to any particular theory of operation of a device according to the present invention, in applicant's opinion in considering the adsorption performance of a sieve bed design, there may be several key dynamics which function interdependent of each other. The critical performance parameters (excluding the bed design itself and related flow dynamics) may be: working pressure of the bed, rate to pressurization, restrictive orifice size, duration of pressurization, flow rate through the sieve bed and molecular sieve performance. If any one of these parameters in a current sieve bed design is changed without adjusting the others, the propagation of the mass transfer zone or breakthrough may be affected.

For instance: If the rate to pressurization is too slow, diffusion may occur in the bed and concentration purity may not be reached. If the rate to pressurization is too fast, "jetting" may occur and cause shadow zones (inactive areas in the sieve bed), early breakthrough, and compromise concentration purity. If the orifice size is wrong, all flow dynamics may be affected which may result in diffusion or early breakthrough. If the duration of pressurization is too short the bed may not be as efficient as it was designed to be and produce less gas. If the duration of pressurization is too long, breakthrough may occur and compromise concentration purity. If the flow rate through the sieve bed is too fast, diffusion of the mass transfer zone or early breakthrough may occur. If the flow rate through the sieve bed is too slow diffusion of the mass transfer zone could occur. If the bulk-loading ratio changes, that is, if the potential for quantity of gas to be adsorbed by the molecular sieve changes, concentration purity may be affected. If the adsorbent selectivity changes, that is, if the preference for the target gas to be adsorbed over the product gas by the molecular sieve changes, concentration purity may be affected.

PRIOR ART

Many industrial processes require purified gases. Such gases are used as reactants to produce other products by techniques called synthesis, i.e., formation of a compound from simpler compounds or elements. Particularly in cases where high purity gases are required, adsorption is used as the separation technique. In particular, pressure swing adsorption (PSA) is frequently used because it is relatively simple, fast, and economical, in addition to having the capability of producing very pure products. The use of PSA is especially prevalent in relatively small sized operations for which the use of a cryogenic separation plant is not economical. This has been on account of the economy of scale of cryogenic plants, which are impractical below capacities of about 6,000 scfm (standard cubic feet per minute) or 10,000 Nm$^3$/h (normal cubic meters per hour).

Most PSA systems produce a single purified gas stream, often the less strongly adsorbed (or light) component, from a given feed mixture. In these systems, the feed gas is passed through an adsorbent bed at a high pressure. In a sequence of steps, called the PSA cycle, this step is referred to as the feed step. The adsorbent, by definition, is capable of selectively adsorbing the more strongly adsorbed (or heavy) component. Hence, the light component passes through the bed and is collected as the purified product. Subsequently, the heavy component is desorbed from the adsorbent, by opening an exhaust valve and allowing gas to escape until a low pressure is reached, which is called the blowdown step. This stream is frequently a by-product or waste. Alternatively, PSA systems can be designed to operate somewhat differently when the desired primary product is the heavy component. For example, Reinhold et al. in U.S. Pat. No. 5,536,300 (1996) disclose a means by which a natural gas feed stream, containing significant quantities of nitrogen can be increased to a content of greater than 95% by volume of methane. In such systems, a rinse step follows the feed step, in which the residual interstitial feed gas is displaced through the bed, for the purpose of recycling it, by introducing product gas. A high purity heavy product is collected by blowdown, and/or evacuation (i.e., depressurization to subatmospheric pressure) and purge steps.

Normally, a low-pressure step follows blowdown or evacuation, called the purge step, in which the light gas is admitted to the adsorbent bed, to drive off some or all of the residual heavy component. Finally, the adsorbent bed is repressurized in order to commence the subsequent feed step, as mentioned at the beginning of this paragraph. Usually, only a single component of the feed mixture is captured as either the light or heavy product, while the remaining components are exhausted from the system as waste. However, in some cases both the light and heavy products can be captured, e.g., as disclosed by Knaebel in U.S. Pat. No. 5,032,150 (1991). U.S. Pat. No. 4,013,429 by Sircar and Zondlo discloses a PSA process in which air is passed first through a pretreatment adsorber to remove moisture and carbon dioxide. The purified air then is passed through an adsorbent bed in which nitrogen is the more strongly adsorbed component. The oxygen-rich product is collected in an expandable receiving vessel. Following the feed step, the main bed is rinsed with high purity nitrogen product gas from a previous stage in the operation.

High purity nitrogen is subsequently desorbed by blowdown and evacuation from the main bed. Following evacuation, the beds are repressurized with a portion of the oxygen-rich gas drawn from the expandable receiving vessel. The process of this system is complicated, having sixteen cycle steps, thirteen valves, at least two compressors and one vacuum pump, and at least two expandable gas receivers. It mentions no enhancement of performance based on the volume or size of the expandable gas receivers relative to that of the adsorbent.

U.S. Pat. No. 4,892,565 by Schmidt et al. (1990) reveals a process for recovery of a heavy (more strongly adsorbed) key component from a gas mixture containing the key component and one or more light (less strongly adsorbed) secondary components using sub atmospheric PSA, sometimes called vacuum swing adsorption (VSA or VPSA). The process reduces or eliminates gas storage vessels and reduces power requirements by operating without a feed compressor. Thus, feed is introduced under vacuum, achieved by pressure equalization between parallel adsorption beds, and due to the presence of a vacuum train for the heavy product. The elimination of product receivers is purely economical, since it mentions no enhancement of performance based on the absence of such receivers.

Several patents disclose the presence of a cavity or reservoir that is used to retain purge gas (e.g., U.S. Pat. Nos. 3,464,186; 4,487,617; and 5,715,621). Those patents are related to PSA separation of moisture from air. U.S. Pat. No. 3,464,186 issued to Hankison (1969) refers to the reservoir as a purge chamber and as the upper plenum. It mentions no enhancement of performance based on its volume or size relative to that of the adsorbent. U.S. Pat. No. 4,487,617 by Dienes et al. (1984) refers to the reservoir as a gas-receiving cavity. It teaches nothing with respect to enhancement of performance based on the volume or size of that cavity relative to that of the adsorbent. U.S. Pat. No. 5,715,621 by Mitsch (1998) refers to the reservoir as a canister bore implying that it is mainly large enough to hold the adsorbent canister, but it teaches nothing with respect to performance enhancement based with respect to its volume relative to that of the adsorbent-filled canister.

Some other patents happen to show reservoirs or cavities, but as a consequence of being intended for radial flow (through an annular bed of adsorbent). For example, U.S. Pat. Nos. 4,863,497; 5,232,479; and 5,759,242, all show adsorbent occupying a portion of the vessel, and empty volume in the remainder. None of those teach anything with respect to enhancement of performance based on the volume or size of the empty volume relative to that of the adsorbent. For example, U.S. Pat. No. 4,863,497 describes splitting that volume into partitions, but mentions nothing about its capacity or size. Similarly, U.S. Pat. No. 5,232,479 says, "It is an object of the present invention to propose an adsorber of compact design, . . . , which . . . limit the dead volumes of gas and, consequently, the losses of charge during operation, and therefore enable a substantially improved productivity." Consequently, if anything, it teaches that excess volume is to be avoided. Claim 14 of U.S. Pat. No. 5,759,242 says, "The vessel as recited in claim 1, wherein void volume within said gas feed channel and said gas feed inlet means is in a range of 10%-25% of volume of said annular adsorbent bed."; while claim 15 says, "The vessel as recited in claim 14, wherein void volume within said product flow channel and said product outlet means is in a range of 3%-10% of volume of said annular adsorbent bed." It goes on to say, "Accordingly, it is an object of the invention to provide an improved vessel for use in a VPSA or PSA process which employs only a single adsorber chamber with low void volumes." Thus, by indicating that product-end void volume should be very small, this patent associates it with inferior performance.

Contrary to the PSA separation processes disclosed in the prior art, the premise of the present invention is that product end void volume, when correctly sized can be beneficial to the operation of a PSA system, by reducing the necessary power and by improving performance through the maintenance of plug flow during the purge step of the PSA cycle. The present invention, then, provides a PSA process and system capable of minimizing the power consumption, and operating cost of recovering a purified product from a feed gas mixture.

SUMMARY OF THE INVENTION

Thus, it is one object of the present invention to provide a gas concentrator, which is less prone than prior PSA devices to diffusion, breakthrough, or jetting. It is also an object of the present invention to generate oxygen-enriched gas utilizing a plurality of zeolite chambers using a more energy efficient method than previously used in prior art. The improved sieve bed design according to the present invention physically manages both breakthrough and the mass transfer zone by way of volumetric division. An empty space in the product end is separated from adsorbent-filled sieve space in the feed end by a mid-diffuser plate. The ratio of the empty product end void space to the adsorbent filled sieve space within a sieve bed is determined by the relative percentages of the gasses to be separated and the bulk loading factor of the molecular sieve. A product end void space of the correct volume may ensure the maximum volume of nitrogen has been adsorbed before breakthrough occurs. This is because the product end void space volume establishes the flow of gas through the molecular sieve. In operation, pressure in both sides of the sieve bed (empty space and sieve filled space) is equal at any instant. This contains breakthrough to the location of the mid-diffuser plate. Also, the mass transfer zone is static at the point of the mid-diffuser plate and as such, gas separation is simply a function of pressure within the bed.

The bed is, thus, unaffected by the rate of pressurization. The operating pressure is infinitely variable within the working range of the molecular sieve and is, in fact, a target operating pressure as opposed to a timed duration of pressure as utilized in a conventional PSA system. Control of the process according to the present invention is managed by timing only, pressure only, or a combination of the two. The advantage of a pressure based system is that it may self adjust for component wear such as valve response time. There is no calibrated orifice in the system upon which all other processes are critically timed. There is no gas flow through the sieve bed during the gas separation process, which allows for a logical stopping point in the process such as a pause during the process while product gas is used. This provides for use in an OCD. For example, once a system according to the present invention has achieved a desired product gas concentration, the concentration may be maintained through a shut down and restart, for example so as to conserve battery life. The sieve bed can function as a reservoir, which saves space. The process in the present invention is thus one of "counter-fill" as opposed to a process of "counter-flow". Counter-fill is more efficient for product gas regeneration than "counter-flow" because the system does not vent product gas such as oxygen.

It is another object of the present invention to provide an OCD that has the ability to dynamically adjust the conserving ratio, that is, to provide a dynamic conserving ratio as required by the patient (or prescribed by a doctor). Thus, the oxygen conserving device may use a 6:1 ratio at the low flow equivalency setting but as the flow equivalency setting is increased it may change it's conserving ratio to a lower or higher conserving ratio as required by the patient. The adjustment of the settings relative to the minimum and maximum oxygen flow may be modified depending on the requirements of the patient. Alternatively, the doctor may choose to prescribe a predetermined quantity of oxygen administered per flow setting, as a direct volume of gas per bolus.

It is yet a further object of the present invention to provide a dynamic sensing of inspiration for the patient. Instead of triggering the release of oxygen from a fixed negative pressure point, the conserving device would increase its sensitivity until inspiration was detected. Once inspiration was detected it would maintain the sensitivity level unless further adjustment was required. If no inspiration was detected it would automatically increase sensitivity until detected. Oversensitivity may be detected by detecting the occurrence of unlikely respiratory rates in which case the system would decrease sensitivity.

The steps in a cycle of the oxygen concentration process according to the present invention may be summarized in one aspect as follows:

(a) Atmospheric air is compressed into a first chamber from the corresponding first feed end through a first conduit. The first chamber is divided into two regions, one at each end with a boundary therebetween (the boundary) created by a diffusion plate mounted across the boundary which retains zeolite in a feed end while the other end, the product end, is empty, hereinafter referred to as the product end void space.

(b) Oxygen enriched gas is then vented from the empty product end void space of the first chamber (the first product end void space) through a second conduit and gas outfeed-line, for end use, for example, by a patient.

(c) Oxygen enriched gas is then released from the first chamber, through a third gas conduit having a third gas conduit intake at the first boundary, that is the boundary between the first feed end and the first product end void space.

(d) The oxygen enriched gas flows through the third gas conduit and enters a second chamber, at the boundary between the second product end (the second product end void space) and the second feed end (the zeolite filled region), hereinafter also referred to as the second boundary, of the second chamber.

(e) The oxygen enriched gas flow is directed from the second boundary toward the feed end of the second chamber. This process is hereinafter referred to as counter-fill.

(f) The first chamber is then vented to the atmosphere through a first exhaust port on the first feed end, either to ambient atmosphere or, for example, through a vacuum pump providing a reduced pressure at the exhaust port.

(g) Atmospheric air is then compressed into the second chamber from the second feed end.

(h) A portion of oxygen-enriched gas is then vented from the second product end void space of the second chamber through the second conduit and gas outfeed-line for end use.

(i) Oxygen enriched gas is then released at the boundary from the second chamber, through the third gas conduit intake and third gas conduit.

(j) The oxygen-enriched gas flows through the third gas conduit and enters the first chamber at the first boundary.

(k) The oxygen enriched gas flow is directed from the first boundary toward the first feed end of the first chamber.

(l) The second chamber is then vented to the atmosphere through a second exhaust port on the second feed end, either to ambient atmosphere or, for example, through a vacuum pump providing a reduced pressure at the exhaust port.

The cycle is then repeated.

The present invention may also be characterized in a further aspect as a gas concentrator for enriching a product component gas concentration in a gas, wherein the concentrator may include:

An air compressor.

An airtight first chamber separated into two adjacent sections namely a hollow first product end and an adjacent first feed end containing molecular sieve material for adsorbing a waste component gas. The first feed end is separated from said first product end by a first gas-permeable boundary member such as a diffusion plate which may in one embodiment be a perforated plate to accommodate gas transfer during counter-fill as defined below. A second air-tight chamber includes a hollow second product end and an adjacent second feed end containing molecular sieve material for adsorbing the waste component gas, the second feed end separated from said second product end by a second gas-permeable boundary member such as a diffusion plate which may in one embodiment be a perforated plate to accommodate gas transfer during counter-fill and the opposing side of which is perforated to allow for the transfer of gas between sieve filled side of the sieve bed and the opposing hole which is open to the empty side of the sieve bed.

The first feed end is in fluid communication with the compressor through a first gas infeed line. The second feed end is in fluid communication with the compressor through a second gas infeed line. A first conduit common to both the first and second gas infeed line, feeds or splits into the first and second gas infeed lines from the compressor. A second gas conduit connects said first and second product ends of the corresponding first and second chambers in fluid communication with each other. The second conduit cooperates with an outfeed line for delivery of the product gas along said outfeed line to an end use. A third gas conduit cooperates in fluid communication with said first and second Boundaries corresponding to the first and second chambers.

First and second exhaust ports are provided on, respectively, the first and second feed ends of, respectively, the first and second chambers for venting to atmosphere, or a vacuum source.

First, second, and third valve means and exhaust valve means, and corresponding actuators, are mounted, respectively, on the first, second, and third conduits, including their respective infeed or outfeed lines, and on the first and second exhaust ports for selective control of gas flow into and out of the product ends and feed ends of the first and second chambers.

The first valve means provides for selective inflow of air from the compressor to either of the first or second feed ends. The exhaust valve means provides for selective exhausting, that is, outflow of gas from either the first or second feed ends passively or with a vacuum source. The second valve means provides for selective gas flow from the first or second product ends, and their respective first or second product end void spaces, to the gas outfeed line for end use of the gas. The third valve means, which may include one or more valves, provides for selective counter-fill between the first and second boundaries. When actuated in sequence oxygen enriched gas is generated alternatingly in the first and second chambers and fed sequentially for end use through the gas outfeed line, the first and second product ends alternatingly automatically recharging and exhausting during the outfeed and counter-fill.

A gas flow controller may be provided for controlling actuation of various valves and/or valve means, so that said valves and/or valve means cooperate to regulate gas flow through said conduits and lines so as to sequentially, in repeating cycles:

(a) prevent the gas from flowing between the first and second chamber and allow compressed air from the compressor into the first chamber during a first gas pressurization phase, whereby the first container is pressurized to a threshold pressure level to create a first enriched gas packet in the first product end having an incrementally enriched product component gas (such as oxygen) concentration, and opening the second chamber exhaust valve means so as to expel, for example to atmosphere or to a vacuum source, the gaseous contents of the second chamber, (b) prevent the gas from flowing between either of the first or second chambers and the compressor and allow a regulated amount of the first enriched gas packet to flow from the first product end into the second gas conduit for delivery of the product component gas for the end use, downstream along the second gas conduit and the gas outfeed line, (c) prevent the gas from flowing between either of the first or second chambers and the compressor or between either of the chambers and the gas outfeed-line, and allow the first enriched gas packet to flow between the boundaries of the first and second chambers from the third gas conduit during a first enriched gas packet counter-fill phase, whereby the first enriched gas packet flows from the pressurized first chamber to the lower pressure second chamber, (d) prevent the gas from flowing between the chambers and actuate the compressor to pressurize the second chamber to the threshold pressure level to create a second enriched gas packet and, open the first chamber exhaust valve means so as to expel, for example to atmosphere or to a vacuum source, the gaseous contents of the first chamber, (e) prevent the gas from flowing between either of the chambers and the compressor and allow a regulated amount of the second enriched gas packet to flow from the second product end into the second gas conduit for delivery of the product component gas for the end use, downstream along the second gas conduit and the gas outfeed line, (f) prevent the gas from flowing between either of the chambers and the compressor or between either of the chambers and the gas outfeed valve, and allow the second enriched gas packet to flow between the boundaries of the first and second chambers through the third gas conduit, during a second enriched gas packet counter-fill phase, whereby the second enriched gas packet flows from the pressurized second chamber to the lower pressure first chamber.

In a further aspect, the present invention may be characterized as a gas concentrator apparatus for enriching a product gas concentration in a gas, wherein the apparatus includes: a pressure differential means such as a compressor, an air-tight first chamber having a hollow first product end and an adjacent first feed end containing molecular sieve material for adsorbing a waste component gas, wherein the first feed end is separated from the first product end by a gas-permeable first boundary member, a second air-tight chamber having a hollow second product end and an adjacent second feed end containing molecular sieve material for adsorbing the waste component gas, wherein the second feed end is separated from the second product end by a gas-permeable second boundary member, wherein the first feed end is in fluid communication with the pressure differential means through a first gas infeed conduit, and wherein the second feed end is in fluid communication with the pressure differential means through a second gas infeed conduit, and wherein a second gas conduit connects in fluid communication with, and selectively between, the first and second product ends, and wherein a third gas conduit cooperates in fluid communication between and to the first and second gas permeable boundary members, and wherein the second gas conduit cooperates in fluid communication with an outfeed line for delivery of the product gas along the outfeed line to an end use, the first and second feed ends having, respectively, first and second exhaust ports for selectively venting the first and second feed ends, first valve means for selective inflow of air from the compressor to either of the first or second feed ends, exhaust valve means for selective exhausting of gas from either the first or second feed ends, second valve means for selective gas flow from the first or second product ends to the gas outfeed line for end use of the gas, and third valve means for selective gas flow between and to the first and second boundary members so that, when the valve means are actuated in sequence, product gas enriched gas is generated alternatingly in the first and second chambers and fed sequentially for end use through the gas outfeed line.

A gas flow controller controls actuation of the valve means to regulate gas flow through the conduits and the outfeed line so as to sequentially, in repeating cycles:

(a) prevent the gas from flowing between the first and second chamber and allow compressed air from the compressor into the first chamber during a first gas pressurization phase, wherein the first container is pressurized to a threshold pressure level to create a first enriched gas packet in the first product end having an incrementally enriched product gas concentration, and opening the second chamber exhaust valve means so as to expel the gaseous contents of the second chamber, (b) prevent the gas from flowing between either of the first or second chambers and the compressor and allow a regulated amount of the first enriched gas packet to flow from the first product end into the second gas conduit for delivery of the product gas for the end use downstream along the second gas conduit and the outfeed line, (c) prevent the gas from flowing between either of the first or second chambers and the compressor or between either of the chambers and the outfeed-line, and allow the first enriched gas packet to flow from the first boundary member to the second boundary member in the third gas conduit wherein the first enriched gas packet flows from a pressurized the first chamber to a lower pressure the second chamber, (d) prevent the gas from flowing between the chambers and actuate the compressor to pressurize the second chamber to the threshold pressure level to create a second enriched gas packet and open the first exhaust valve means so as to expel to atmosphere the gaseous contents of the first chamber, (e) prevent the gas from flowing between either of the chambers and the compressor and allow a regulated amount of the second enriched gas packet to flow from the second product end into the second gas conduit for delivery of the product component gas for the end use downstream along the second gas conduit and the outfeed line, (f) prevent the gas from flowing between either of the chambers and the compressor or between either of the chambers and the outfeed valve, and allow the second enriched gas packet to flow between the first and second boundary members through the third gas conduit wherein the second enriched gas packet flows from a pressurized the second chamber to a lower pressure the first chamber.

The boundary members may be gas diffusers. The third conduit has opposite first and second ends, the first and second open ends having corresponding first and second apertures therein, and wherein the first and second apertures are adjacent and spaced from, respectively, the first and second boundary members. The first and second apertures may be substantially parallel to, respectively, the first and second boundary members. The second conduit may be a tube.

First and second infeed gas diffusers may be mounted adjacent, respectively, the first and second gas infeed conduits so as to diffuse gas fed into the first and second feed ends through the first and second gas infeed conduits, whereby the molecular sieve material is sandwiched, respectively, between first boundary member and the first infeed gas diffuser, and between the second boundary member and the second infeed gas diffuser.

First and second gas plenums may be provided, respectively, between the first gas infeed conduit and the first infeed gas diffuser, and between the second gas infeed conduit and the second infeed gas diffuser. First and second gas manifolds may be mounted respectively, adjacent and between the first end of the second conduit and the first boundary member, and adjacent and between the second end of the second conduit and the second boundary member.

The method of the present invention may further include:
a) providing a means for detecting a drawing of the oxygen enriched gas to the end use from the second conduit, a means for detecting a pressure drop below a lower threshold pressure in a reservoir of the oxygen enriched gas cooperating in fluid communication with the second conduit wherein the pressure drop is due to the drawing of the oxygen enriched gas from the second conduit, a means for signalling the pressure drop to the means for controlling gas flow;
b) establishing a pressurized reservoir of the oxygen enriched gas for delivery through the second conduit for the end use;
c) ceasing the flow of gas into or between the first and second chambers once the pressurized reservoir of the oxygen enriched gas is established until the pressure drop below the lower threshold pressure, upon the detection of which re-commencing the flow of gas into or between the first and second chambers.

The method may further include providing a discrete reservoir for the reservoir of the oxygen-enriched gas.

The product ends may in one embodiment provide the reservoir of the oxygen-enriched gas.

The method may further include the step of monitoring pressure in the reservoir of the oxygen-enriched gas. The method may further include the step of ceasing production of the oxygen-enriched gas upon detection of pressure equal to or greater than an upper threshold pressure in the reservoir of the oxygen enriched gas. The method may further include providing a means for selectively varying a delivery volume of the oxygen-enriched gas delivered per the drawing to the end use. The method may further include providing a means for selectively varying the sensitivity of the means for detecting a drawing of the oxygen-enriched gas.

The method may further include the steps of:
a) pre-setting a selectively adjustable oxygen conservation ratio in the means for controlling gas flow and a selectively adjustable drawing sensitivity,
b) monitoring for pressure change, which according to the drawing sensitivity, is indicative of drawing of the oxygen enriched gas from the second conduit for the end use,
c) upon detection of the sharp pressure change, allowing the oxygen enriched gas to flow from the reservoir along the second conduit to the end use in a volume according to the pre-set oxygen conservation ratio.

The method may further include the steps of:
a) monitoring time intervals between or frequency of sequential the drawings of the oxygen enriched gas,
  b) selectively varying the conservation ratio and/or the drawing sensitivity so as to:
  (i) increase the sensitivity upon an increase in the time interval or drop in (ii) the frequency relative to first threshold values;
  (iii) decrease the sensitivity upon a decrease in the time interval or increase in the frequency relative to second threshold values;
  (iv) increase the conservation ratio so as to decrease supply of the oxygen enriched gas if the conservation ratio is low and the drawing frequency is low; or,
  (v) decrease the conservation ratio so as to increase supply of the oxygen enriched gas if the conservation ratio is high and the drawing frequency is high.

In a broader sense, the present invention operates on a gaseous mixture of a less strongly adsorbed (or light) component and a more strongly adsorbed (or heavy) component, which is more strongly adsorbed by an adsorbent, where the light component is selectively separated from the gaseous mixture in a PSA process, as described herein.

DETAILED DESCRIPTION OF EMBODIMENTS OF THE INVENTION

The mechanics of a one half-cycle will now be described.

Figure 3:
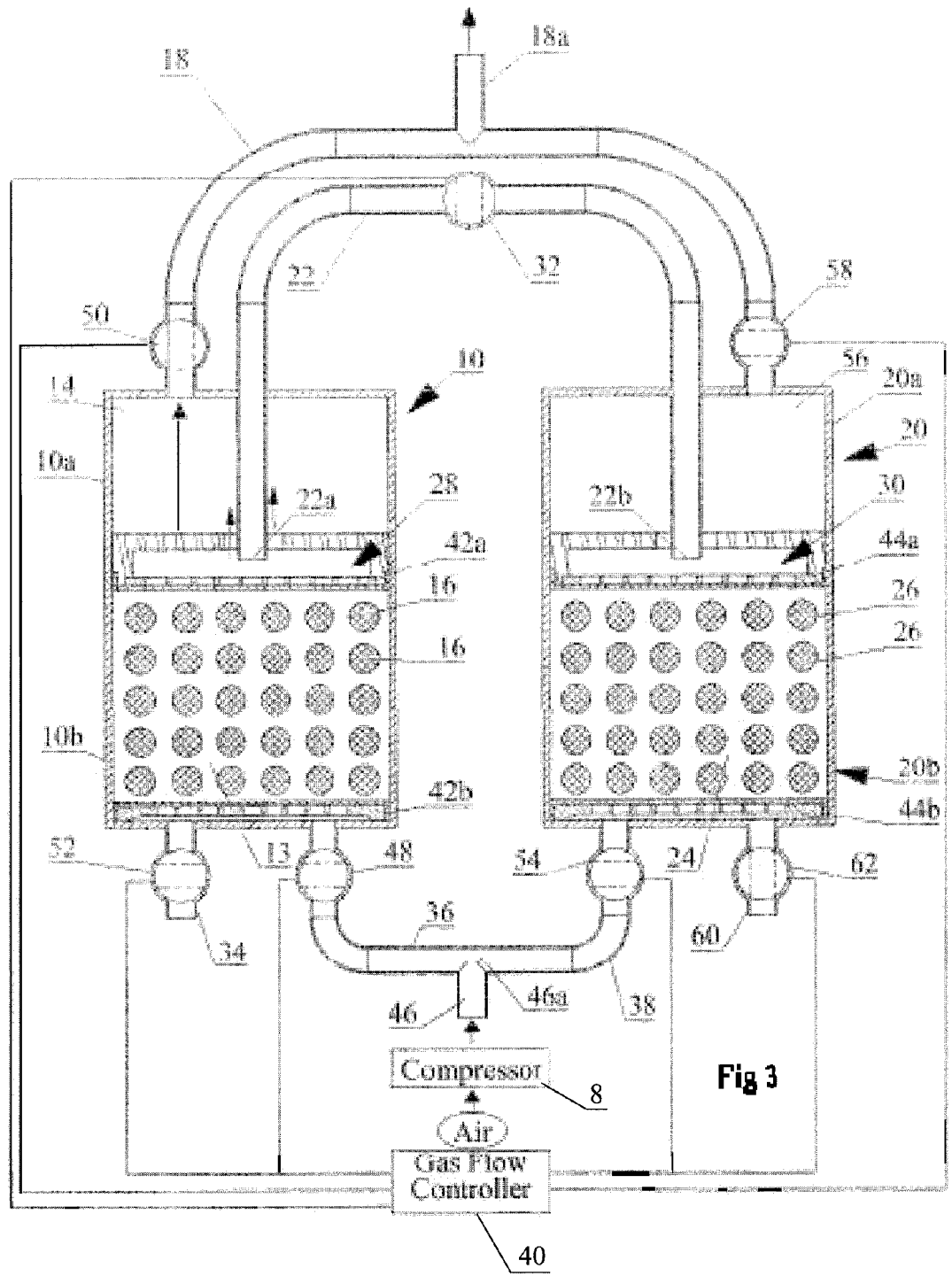
FIG. 3 is the sectional view of FIG. 2 wherein no further compressed air is being pumped into the first zeolite container and a first portion of the enriched oxygen gas in the product end of the first zeolite container is being bled off to the patient through a gas outfeed line.

In the present invention, wherein like reference numerals denote corresponding parts in each view, a first container is pressurized with air by a compressor (shown in FIG. 3). Advantageously, the first container contains a high mole fraction of oxygen and is pressurized with atmospheric air. Nitrogen will adsorb to the zeolite more readily than oxygen. As a result there will be a higher concentration of oxygen in the zeolite void space and the product end void space than there was in the original air mixture. Ensuring the starting oxygen mole fraction is high can produce high oxygen concentration end use gas. This ensures effectively all the nitrogen from atmospheric pressurization can be adsorbed by the zeolite.

Some of the product end void space gas is then released for end use from the first container.

When a gas mixture is vented from any pressurized zeolite container, the oxygen enriched zeolite void space gas will be vented first. As a result, most of the oxygen will be evacuated before the nitrogen. However, after the oxygen-enriched gas is vented from the zeolite in the container, nitrogen is immediately released from the zeolite and thus may dilute the oxygen concentration.

In the present invention, first container 10 has a first product end 10a having a cavity or product end void space 14 that does not contain nitrogen-releasing zeolite. The zeolite 16 is confined to first feed end 10b. As a result, when first container 10 is vented to deliver oxygen-enriched gas, the first released gas has little or no added nitrogen content. Thus it is desirable that all the end use product component gas, that is, oxygen-enriched gas, should be vented from the product end void space 14.

It is important to consider the relative volumes of feed end 10b to product end 10a. If the product end 10a is too small, then the end use gas volume will not be the maximum volume attainable. If the product end 10a, that is, the product end void space 14 is too large, then the zeolite will not be able to adsorb all the nitrogen during atmospheric pressurization and dilution of the product end void space gas (that is dilution of oxygen with nitrogen) will result. Testing of one embodiment of the present invention has shown the following ratio to be an optimum for the separation of oxygen and nitrogen with a zeolite having a bulk-loading factor of 3:1. That is, using a zeolite filled container that can hold three times the volume of gas at the operational pressures compared to an empty container of the same volume as the volume of the zeolite container, and assuming 100% of the nitrogen is adsorbed by the zeolite, then 79 parts nitrogen in air will fill a volume of 26.3 parts. Add this to the 21 parts of oxygen in the air and the zeolite filled portion of the container becomes 55.6%. The product end void space 14 should therefore be 44.4% of the zeolite container. A perforated barrier such as the mid diffuser plate better described below may be mounted therebetween to partition or demark the boundary. This principle also applies to the separation of other target gasses as well.

End-use concentrated oxygen is bled off via second conduit 18 and gas outfeed line 18a and then the second zeolite container 20 is counter-filled. During the counter-fill stage, the first container 10 is partially depressurized through third conduit 22 to feed oxygen enriched gas to pre pressurize or counter-fill second container 20. This sufficiently increases the mole fraction of oxygen in second container 20 to produce high oxygen fraction zeolite void space gas in the zeolite void space 24 of zeolite 26. The oxygen-enriched gas fed into the second feed end 20a of second container 20 during the counter-fill takes up a portion of the volume in the second container 20 that would have been taken up by air. As a result, the nitrogen content of the air, from atmospheric pressurization that is from using compressor 8 cannot become large enough to dilute the output gas concentration. This counter-fill gas volume, once produced, is in part cyclically re-used over and over again.

Oxygen desorbs faster than nitrogen. Thus, at the end of counter-fill, the nitrogen content of the counter-fill gas coming into container 20 from container 10 is very high. If the counter-fill gas volume fed into container 20 from container 10 is too large, then the net oxygen concentration of the zeolite void space gas in container 20 will drop below that of air. In that event, the gas volume that can be delivered for end use will be reduced.

A gas separating system will not work efficiently if the end counter-fill gas, that is, the high nitrogen concentration gas at the end of the counter-fill from one container into the other, ends up in the product end void space of either container.

To ensure that this end counter-fill gas does not end up in the product end void space of either container, the third gas conduit 22 extends through the product end void space of both containers to the mid-diffuser plates of boundary 28 and the boundary 30 of containers 10 and 20 respectively. Boundaries 28 and 30 and their corresponding mid-diffuser plates provide a physical means to manage the volumetric ratio of the feed end to the product end. Mid-diffuser plates may be felt-covered rigid perforated gas diffuser plates as described below.

The counter-fill gas flows from container 10 to container 20 is as follows: Due to the pressure differential between container 10 and container 20, when the third valve 32 is opened, aperture 22a to third gas conduit 22 in container 10 becomes a point vacuum source. Counter-fill gas is drawn to the point vacuum source of aperture 22a from both the zeolite void space 13 and from the product end void space 14. Because the gas released from the zeolite 16 is drawn to the point vacuum source, very little nitrogen-enriched gas reaches the product end void space.

The counter-fill gas flows through third conduit 22 and out of aperture 22b at boundary 30 in container 20. The counter-fill gas is directed toward the zeolite 26 in feed end 20b in container 20.

Counter-fill is ceased while container 10 is still at a pressure, which is above atmospheric. The high nitrogen content waste gas may thus be vented to atmosphere from the feed end 10b of container 10 without the use of mechanical energy or with a vacuum assist. If this waste gas were vented from the product end, then the product end void space 14 would be contaminated with high nitrogen content gas. As noted above, atmospheric air during pressurization using compressor 8 is introduced into container 10 from the feed end 10b. The vent conduit or exhaust port 34 on the feed end 10b of container 10 is advantageously a separate conduit from the atmospheric infeed line 36 from the compressor 8. After the completion of the vent cycle, the vent conduit is full of nitrogen-enriched gas. If this conduit were connected to the atmospheric pressurization infeed lines 36 or 38, then the nitrogen would be blown back into container 10 during the next cycle.

Operation of the opening and closing of the valves, as set out below, may advantageously be automated, for example controlled by a gas flow controller 40 such as seen in FIG. 3. The valves are illustrated as being manually actuated for ease of understanding and for clarity of the illustrations, and are not intended to be so limited. The reference to valve means herein is intended to encompass and include both valves and actuators.

The zeolite 16 and 26, in containers 10 and 20 respectively, are sandwiched by four porous retaining plates; namely, plates 42a and 42b in container 10 and plates 44a and 44b in container 20 and, thus sandwiched. The porous plates may be covered with felt 45 or other membranes or porous material to assist in diffusing the flow of gas and to help contain the zeolite particles, which, although illustrated as being relatively large, are usually much smaller, for example particles of 0.5 mm in diameter. The plates and felt are mounted to enclose the zeolite filled regions.

With reference now to the operation of the device according to the present invention, in the start-up condition, first and second zeolite containers 10 and 20 respectively, are at atmospheric pressure. First zeolite container 10 is pressurized with atmospheric air from compressor 8. Air from compressor 8, passes through first conduit 46, junction 46a, conduit 36 and valve 48, at the feed end 10b of zeolite container 10. Oxygen enriched gas is then vented from product end void space 14 at the product end 10a of first zeolite container 10, to be delivered to the patient or other end use, through valve 50, second conduit 18, and gas outfeed line 18a.

Oxygen enriched gas is then vented from container 10 by way of third conduit 22 through valve 32 so as to partially pressurize container 20. Container 10 is then vented to the atmosphere from the feed end 10b, through valve 52 and exhaust port 34, and container 20 pressurized with atmospheric air from compressor 8, through first conduit 46, junction 46a, second gas infeed line 38, valve 54, at the feed end 20b of container 20.

Oxygen enriched gas is then vented from product end void space 56 at product end 20a, of container 20, to be delivered to the patient or other end use, through valve 58, second conduit 18, and gas outfeed line 18a.

Oxygen enriched gas is then vented from container 20 to container 10 by way of third conduit 22 through valve 32 so as to partially pressurize container 10. Container 20 is vented to the atmosphere from the feed end 20b, through second exhaust port 60 and valve 62.

The cycle is repeated as air is pressurized into first zeolite container 10. What follows is a more detailed description of the device during start-up and during one cycle of operation:

In the start-up condition containers 10 and 20 are at atmospheric pressure. All valves may be closed.

Figure 1:
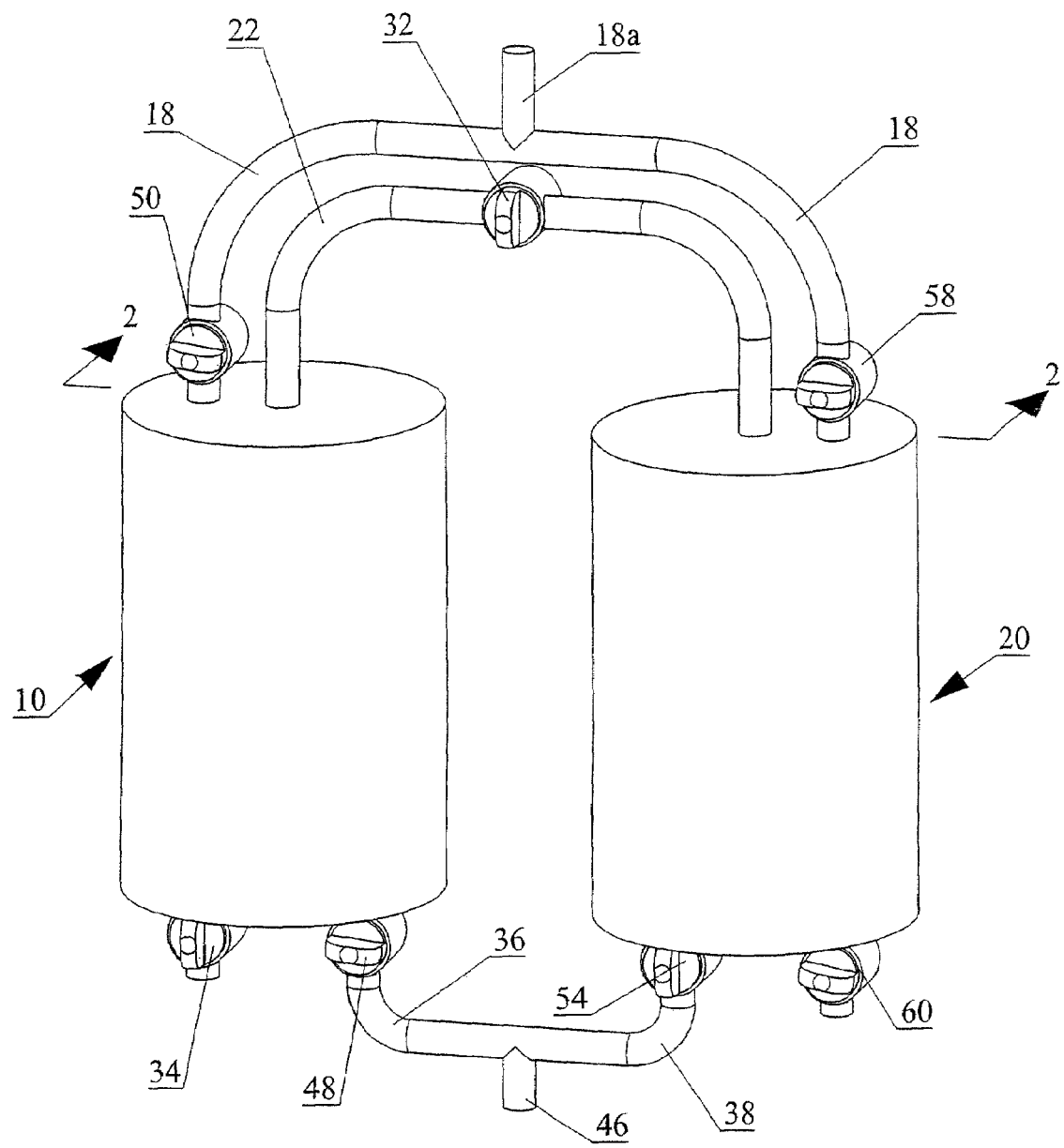
FIG. 1 is, in perspective view, an oxygen concentrating apparatus according to one embodiment of the present invention.
Figure 2:
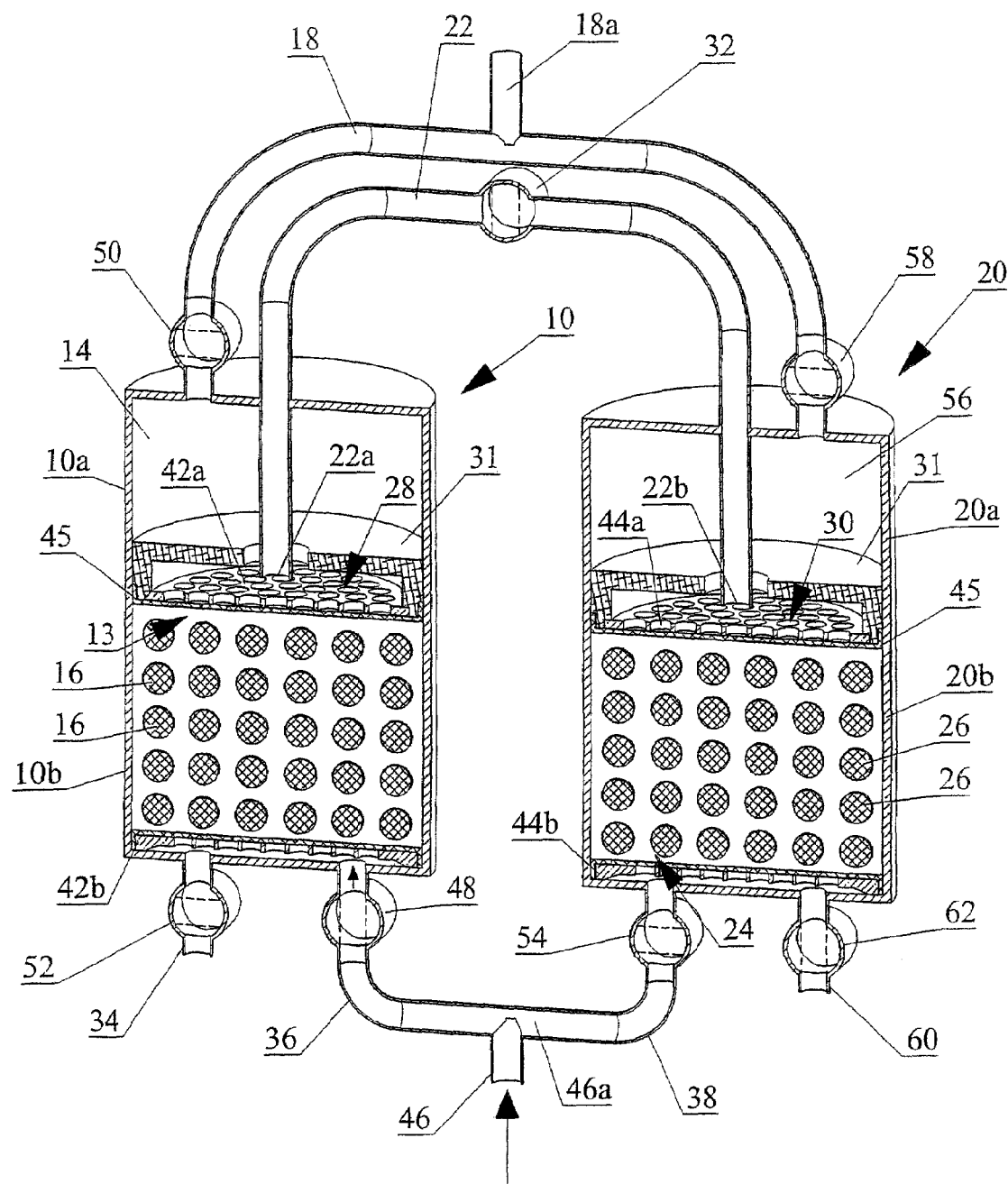
FIG. 2 is a sectional view along line 2-2 in FIG. 1 wherein a first zeolite container is being pressurized with compressed air, and wherein a second zeolite container is being vented to atmosphere.

As seen in FIG. 2, valves 32, 50 and 52 are closed. First zeolite container 10 is then pressurized by compressor 8 so as to cause pressurized atmospheric air to flow through conduits 46 and 36 and through open valve 48 into feed end 10b.

As seen in FIG. 3, valve 48 is closed, the compressor 8 may be shut off, and valve 50 opened so as to vent oxygen enriched gas from product end void space 14 in product end 10a to an end user such as a patient via conduits 18 and 18a.

Figure 4:
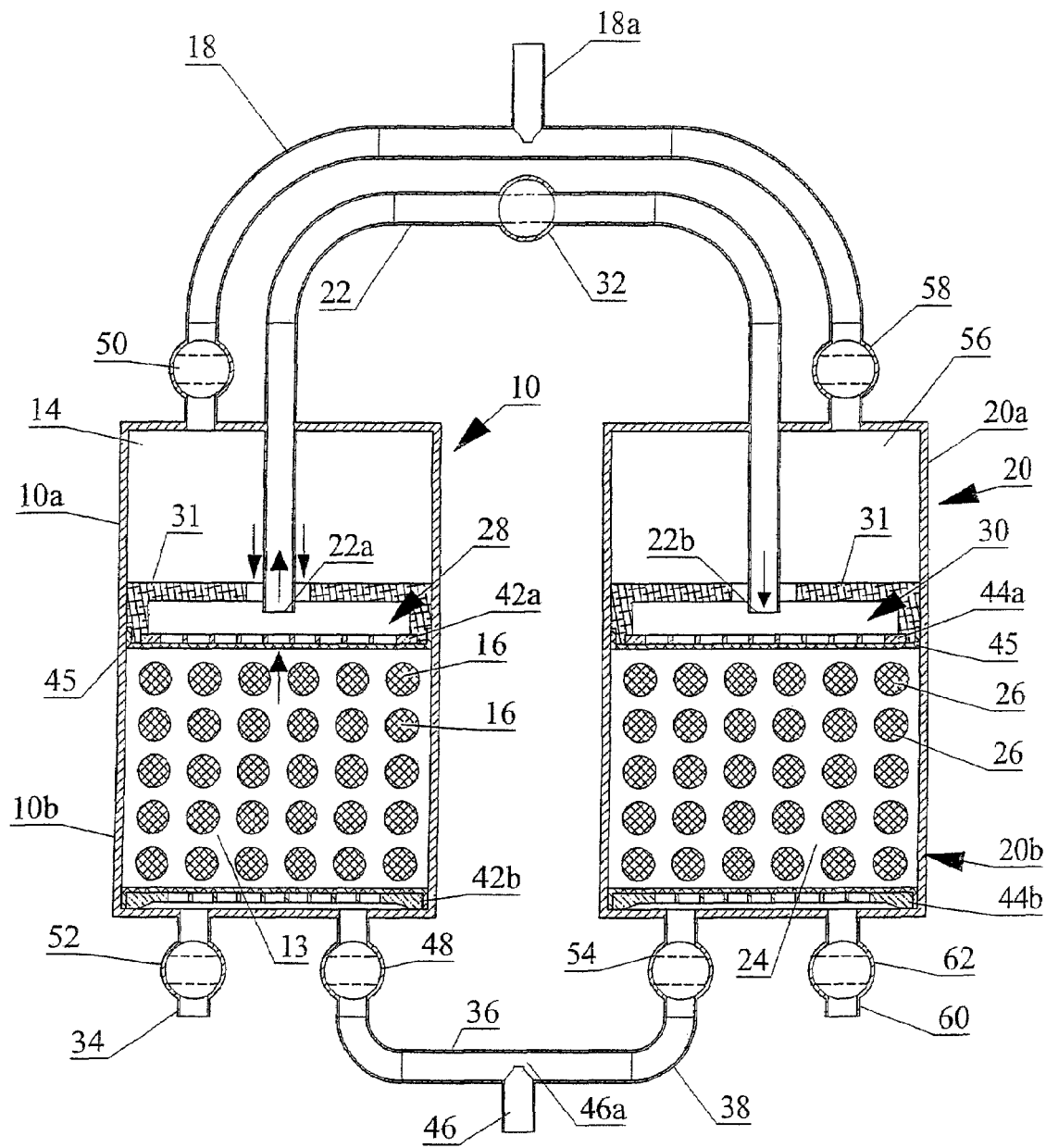
FIG. 4 is the sectional view of FIG. 3, wherein the flow of enriched oxygen to the patient from the first zeolite container has been stopped, and a further portion of the enriched oxygen gas from the boundary of the first zeolite container is being fed into the zeolite region, the feed end, of the second zeolite container.

As seen in FIG. 4, valves 50 and 62 are closed and valve 32 opened. Oxygen enriched gas is then vented from container 10 by way of conduit 22 through valve 32 so as to partially pressurize container 20. The enriched gas leaves conduit end 22b of conduit 22 into an interface between the product end void space and the zeolite end, which, as illustrated, may be a partially enclosed manifold at boundary 30 bounded by a cup or rimmed plate 31 through which conduit end 22b is mounted and rigid perforated mid-diffuser plate 44a, advantageously covered by porous gas diffusing membrane or material such as felt 45.

Figure 5:
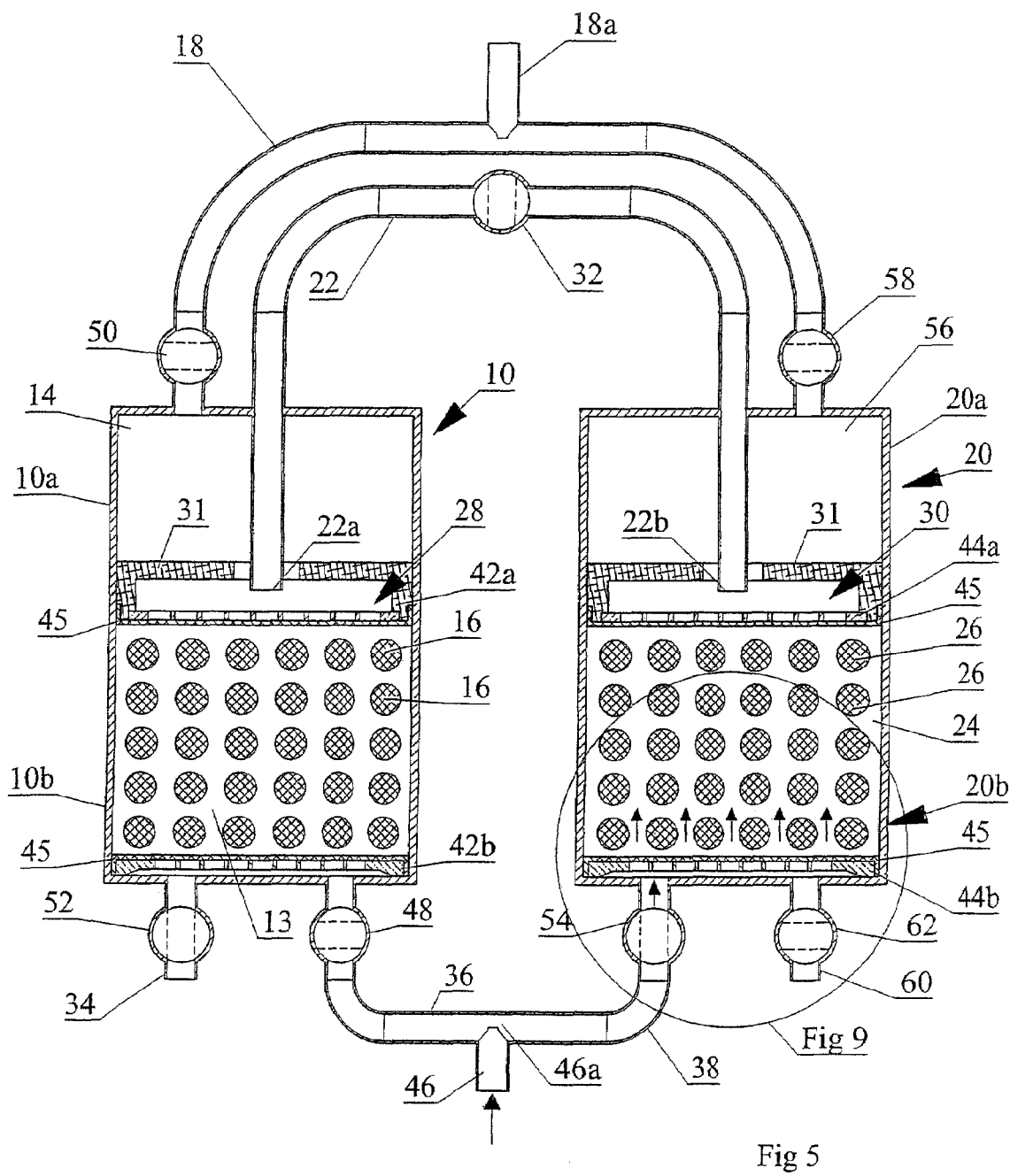
FIG. 5 is the sectional view of FIG. 4 wherein the first zeolite container is vented to atmosphere and the second zeolite container is being pressurized with compressed air.
Figure 6:
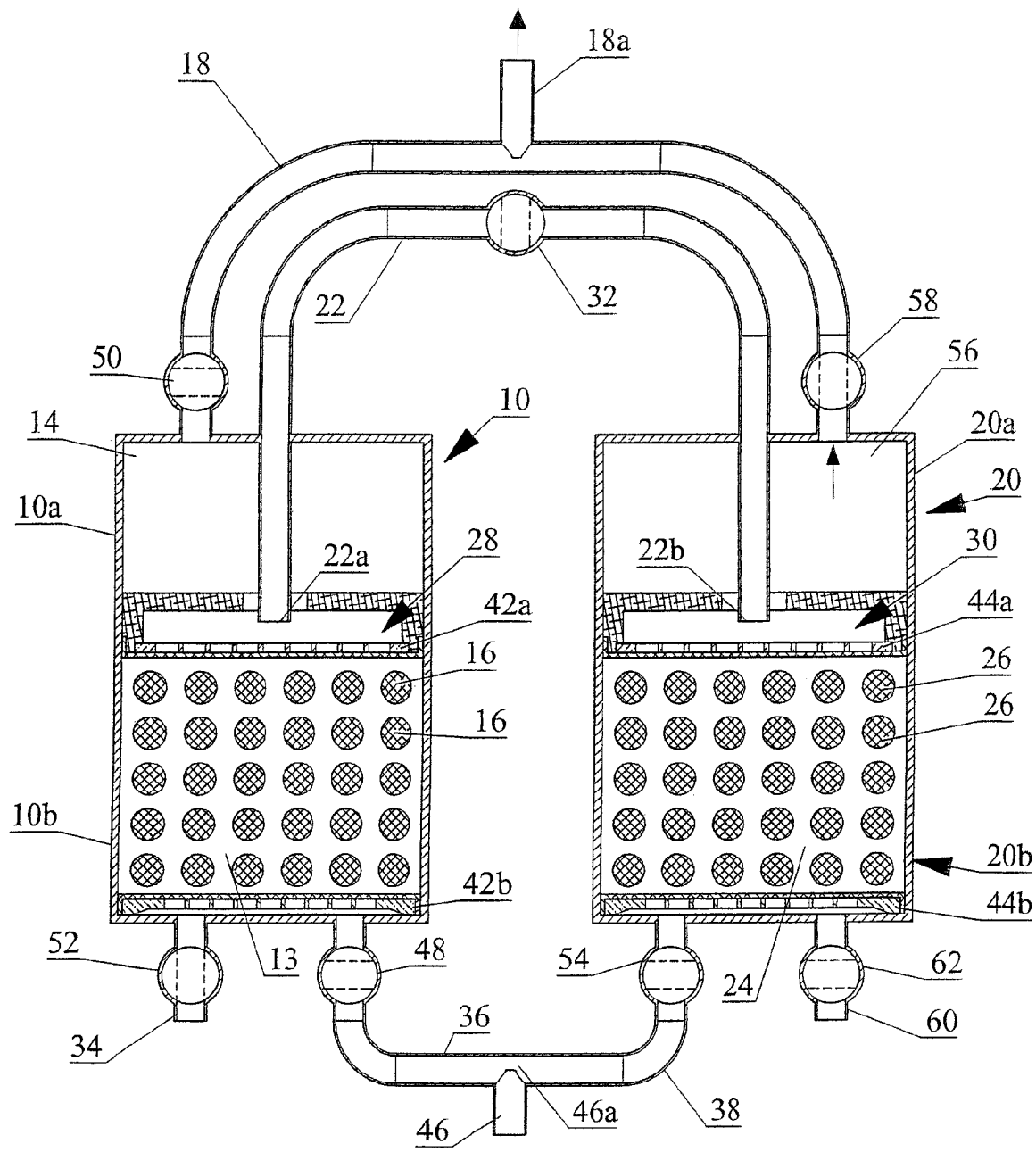
FIG. 6 is the sectional view of FIG. 5 wherein pressurization of the second container has stopped, and a first portion of the enriched oxygen gas from the product end of the second zeolite container is bled off to the patient, and wherein the first zeolite container is being vented to atmosphere.
Figure 9:
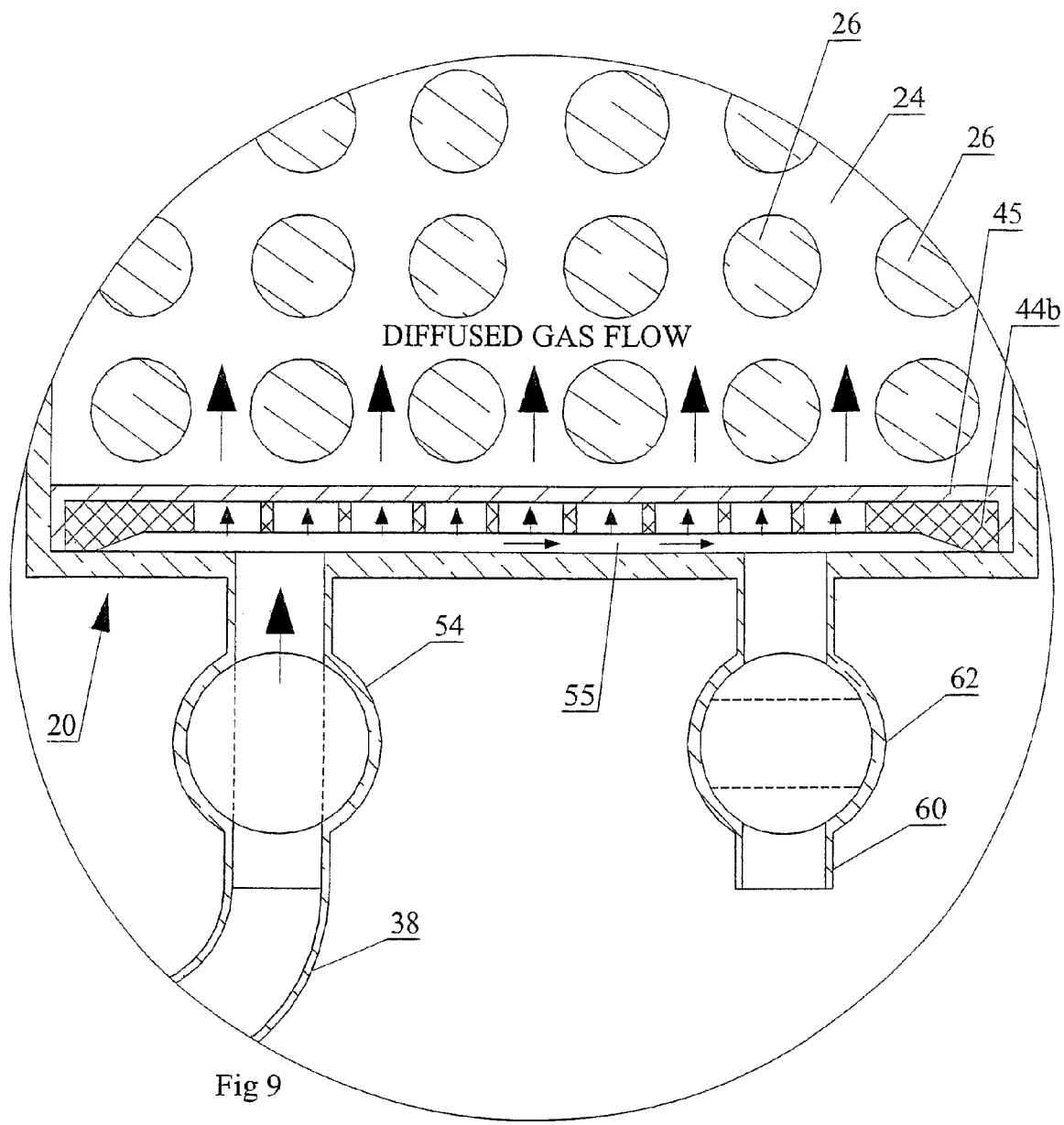
FIG. 9 is an enlarged view of a portion of FIG. 5.

As seen in FIGS. 5 and 9, valve 32 is closed and valve 54 opened so that compressed atmospheric air from compressor 8 flows via conduit 46, junction 46a, conduit 38, and through valve 54 into feed end 20b of container 20 where the gas is distributed in gap or manifold 55 for diffusion through the perforations in diffuser plate 44b and felt 45. The object is to provide a means for evenly distributing the gas flow across the sieve bed. Container 10 has the same diffuser arrangement as container 20. Valve 52 is opened so as to vent feed end 10b to the atmosphere. As seen in FIG. 6, valve 54 is closed, and compressor 8 may be shut off. Valve 58 is opened so as to vent oxygen-enriched gas from product end void space 56 in product end 20a through valve 58 and, conduits 18 and 18a to an end user such as a patient.

Figure 7:
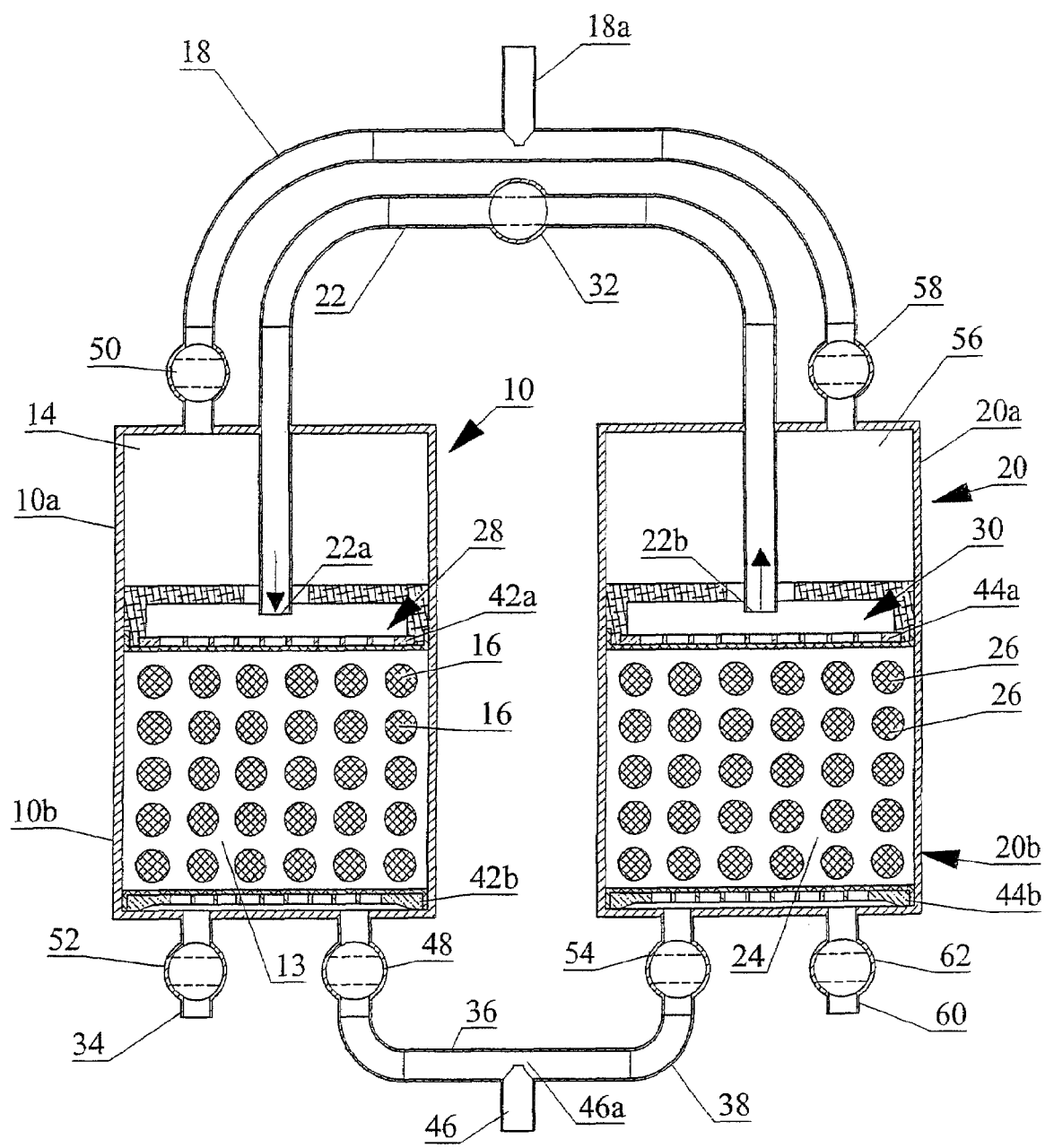
FIG. 7 is the sectional view of FIG. 6 wherein the flow of oxygen enriched gas to the patient has been stopped, and a further portion of the oxygen enriched gas from the boundary of the second zeolite container is being fed into the zeolite region, the feed end, of the first zeolite container.

As seen in FIG. 7, valve 58 is closed and oxygen enriched gas vented from container 20 to container 10 by way of conduit 22 through valve 32 so as to partially pressurize container 10.

Figure 8:
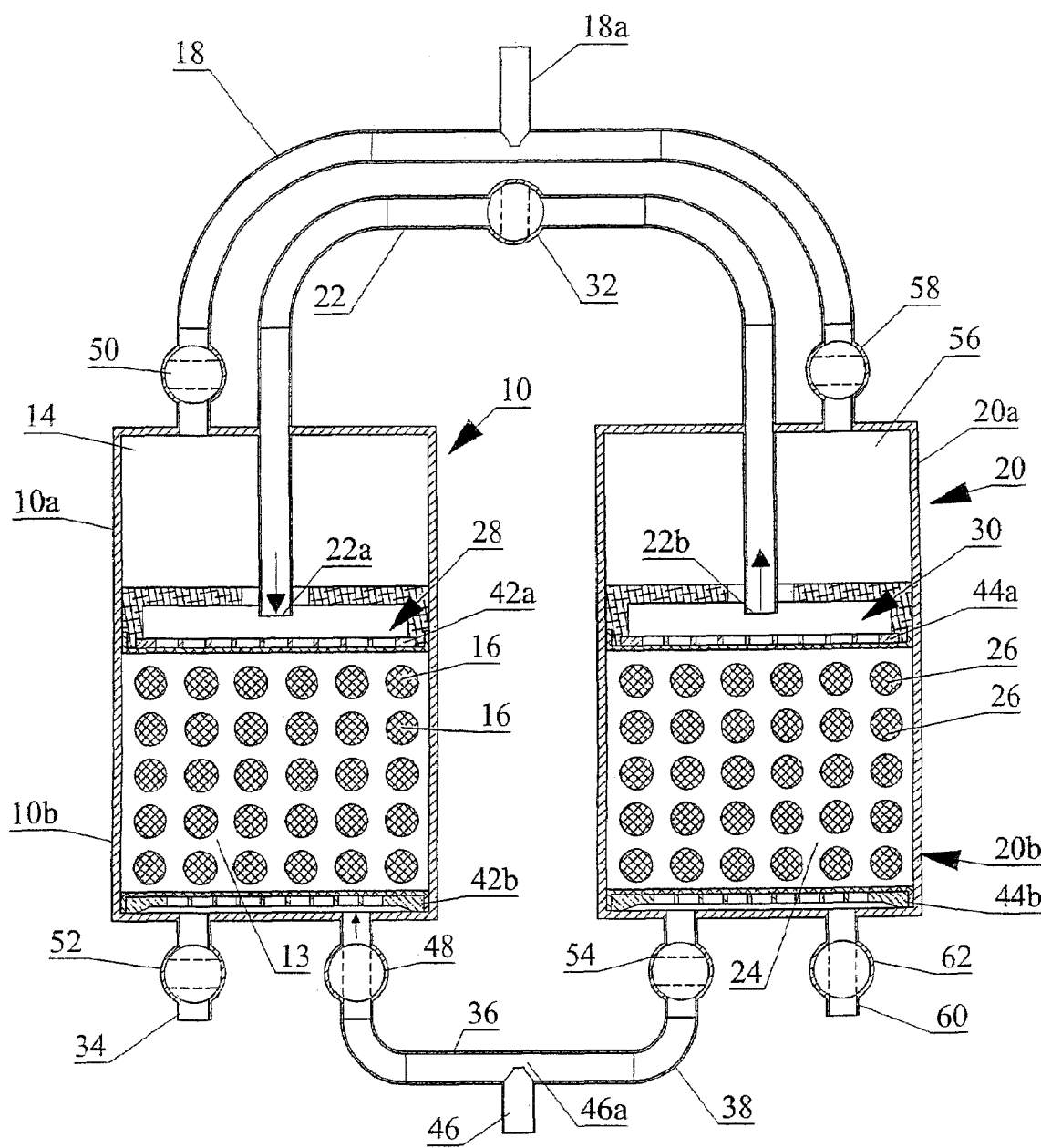
FIG. 8 is the sectional view of FIG. 7 wherein the counter-fill pressurization of the first zeolite container has stopped, and the first zeolite container is once again being pressurized with compressed air, and the second zeolite container is once again being vented to atmosphere.

As seen in FIG. 8, valve 32 is closed and valve 62 is opened, so as to vent container 20 and valve 48 opened to commence the cycle again with pressurization of container 10.

Figure 10:
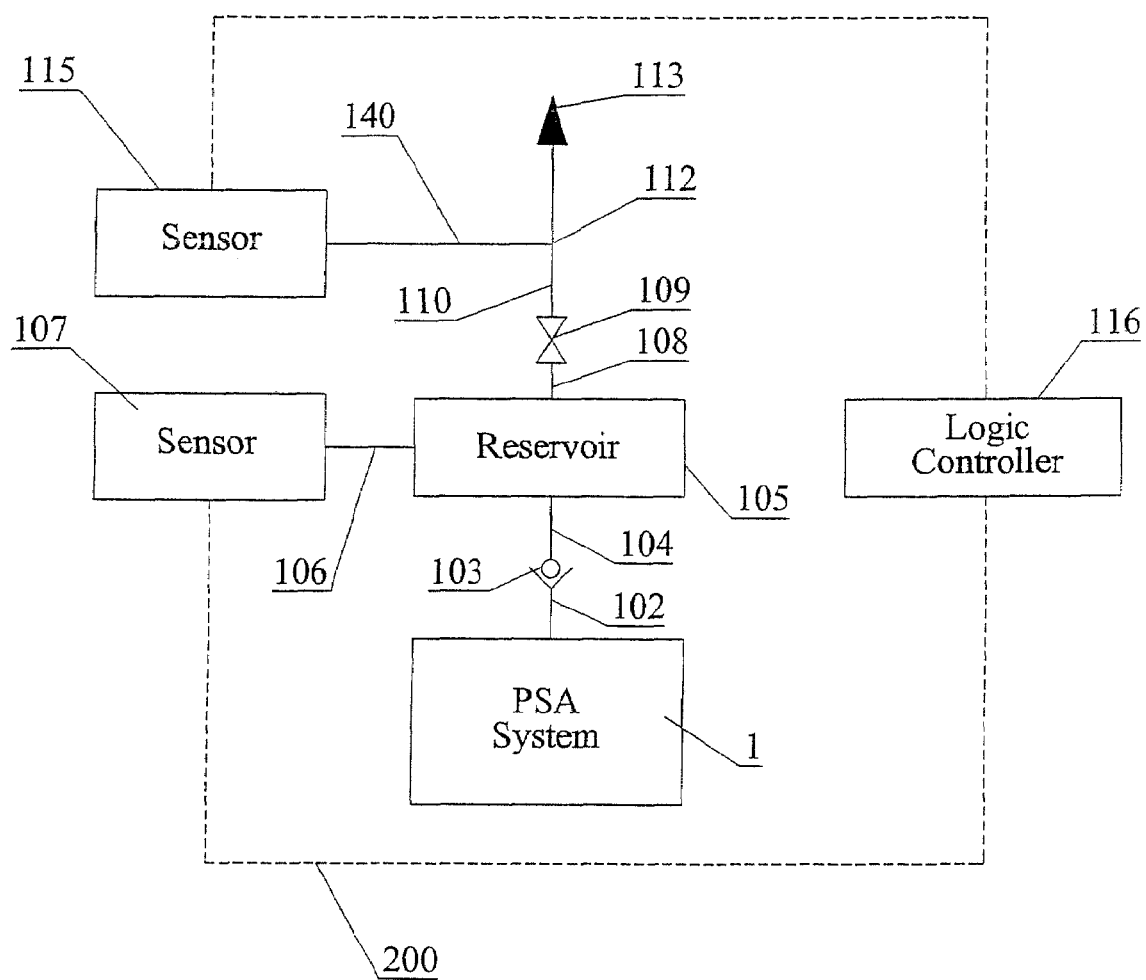
FIG. 10 is a diagrammatic view of a demand cycle PSA system according to an alternative embodiment of the present invention.

A product gas concentrator, such as the oxygen concentrator described above may operate as the product gas source in an OCD such as depicted in FIG. 10. An OCD may complement the operation of a PSA system such as that according to the present invention in allowing for shutdown and re-start of the PSA system to thereby conserve the PSA system battery or batteries when the reservoir is sufficiently pressurized with concentrated gas. Thus as seen in FIG. 10, pressure swing adsorption system 1 such as the oxygen concentrator according to the present invention as described above generates oxygen enriched gas. The oxygen enriched gas flows through gas conduit 102, first valve 103, conduit 104, to gas reservoir 105. Alternatively the function of gas reservoir 105 is served by the product end void spaces in the embodiment of the present invention described above. Thus the oxygen-enriched gas is stored in either the gas reservoir 105 or the product end void spaces 14 and 56. The gas pressure in reservoir 105 is sensed by a first sensor 107 in fluid communication with the gas reservoir 105 by way of gas conduit 106. The first sensor 107 sends gas reservoir 105 pressure data to a logic controller 116 via a network such as communication means 200. When the gas reservoir 105 reaches a pre-determined maximum operating pressure, the logic controller 116 stops the pressure swing adsorption system 1 from generating oxygen, thus conserving energy. The logic controller 116 closes the first valve 103 to stop the oxygen-enriched gas stored in the gas reservoir 105 from flowing back to the pressure swing adsorption system 1.

The patient receives the oxygen-enriched gas by way of a cannula (not shown) connected to an outlet 113 of gas conduit 112. Sudden changes in pressure caused by inspiration are detected in the gas conduit 113 by way of a second sensor 115 connected to gas conduit 110 at junction 112. The second sensor 115, communicates the sudden change in pressure to the logic controller 116. The logic controller 116 opens a second valve 109 to release the oxygen-enriched gas from the gas reservoir 105, by way of gas conduit 110, to the patient through outlet 113. After a pre-determined period of time, the logic controller 116 closes the second valve 109 stopping the release of oxygen-enriched gas from the gas reservoir 105. When the first sensor 107 detects a minimum pre-determined pressure in the gas reservoir 105 the logic controller 116 turns on the pressure swing adsorption system 1, repeating the cycle. Thus again, pressure measurements are detected from the patient supply 113. Changes in pressure propagate through gas conduit 110, junction 112 and gas conduit 140.

Pressure measuring means 115 in fluid communication with gas conduit 140 continuously transmits pressure measurements via measurement transmitting means to logic controller 116.

The logic controller 116 stores in memory times and pressure values. Thus, logic controller 116 stores a memory value for oxygen delivery time for both a high and a low conserving ratio. Logic controller 116 also stores in memory a value for high breath (that is, inspiration or drawing) sensitivity. Logic controller 116 also stores in memory the settings for the values in use. For example, logic controller 116 may be set so that valve 109 actuation is based on a high breath (that is inspiration) sensitivity and a high conserving ratio gas delivery volume.

If logic controller 116 identifies a sharp change in pressure in the gas conduit, within a preset pressure threshold range, controller 116 transmits logic output signals by way of logic communication means 200 to actuable valve 109 to open the value for a predetermined time. If the logic controller 116 identifies a sharp change in pressure, but the frequency, that is the number within a certain time, of the detected pressure change is too high, then the controller lowers the breath sensitivity setting. If logic controller 116 identifies a sharp change in pressure immediately after oxygen delivery has been delivered, the logic controller 116 ignores the signal to act as a stabilizer or debounce feature. If logic controller 116 identifies a prolonged period of time in which no sharp changes in pressure have occurred, the logic controller changes the setting so as to increase the breath detection sensitivity. If logic controller 116 identifies a sharp change in pressure, and the frequency of the change is too high, and the breath detection sensitivity is low, then the controller changes the oxygen delivery time to a low or lower conserving ratio to increase the oxygen volume delivered to the patient per breath. If logic controller 116 is set to a low conserving ratio and the rate of sharp changes in pressure in the gas conduit is reduced then logic controller 116 changes the settings so as to increase the oxygen conserving ratio in order to reduce oxygen consumption.

PSA Analysis

The adsorbent-filled portion of the present vessel functions similarly to any other PSA adsorber. The empty space is different, however. As pointed out in above, some previous adsorbers employed empty space to retain gas in order to purge the adsorbent bed, and thereby to complete its regeneration. Hence, it is a convenience only for storage. In the present case, the volume serves an additional purpose that is explained below.

Most PSA systems are intentionally designed to have very little excess volume at the product-end of the adsorber. Consequently gas that reaches that end, by passing through the adsorbent, is extracted and stored in a separate receiver vessel. Subsequently, a portion of that gas is admitted back into the adsorbent bed at the same end, first at low pressure for purging it, which means that decompression of the gas occurred, or under increasing pressure, i.e., during which the adsorbent is repressurized. There is a decrease in pressure of the gas going into the receiver, or flow would not occur. Similarly, there is a decrease in pressure between the receiver and the adsorber, when part of the product gas is recycled, or the gas would not flow. The pressure drop is associated with throttling (since no useful work is done), but the drop in pressure equates to a loss of the ability to do work.

Work

The gas in the space will be treated as an ideal gas, for simplicity. The same concepts apply whether that assumption is valid or not. If the gas is non-ideal, the calculations are merely more complicated, but the same thermodynamic principles apply, e.g., conservation of energy and of material.

It is desired to understand what happens to the gas in the product-end reservoir as pressure is increased by admitting feed.

1. As feed is admitted, the heavy component is retained by the adsorbent, and the light component percolates through the adsorbent.
2. As the light gas percolates, the light gas flows into the product-end reservoir causing its pressure to increase.
3. The appropriate material balance on the gas contained in the product-end reservoir, employing the ideal gas law, is:
4. An energy balance on the gas contained in the product-end reservoir, again employing the ideal gas law.

Normally, a product pressurized PSA process is more efficient than a feed pressurized PSA process, assuming adiabatic conditions. Such is not the case for the inventive PSA process and such phenomenon is believed to be due to the ability of the inventive PSA process design to recover the temperature component, which would otherwise be lost.

Additional concepts for modifying the inventive PSA system disclosed herein include the following.

Air Flow Ramping

In the interest of maintaining plug flow within the sieve bed, it may be beneficial to balance flow into the bed with pressure in the bed. For example, if we have a large diameter sieve bed and want to minimize $N_2$ incursion into the PVS (Product Void Space) we could start the pressurization stage with a lower flow rate and increase it as pressure builds in the sieve bed.

Series Sieve Beds

It may be desirable to extract more than one product gas in a single pass. Arranging a series of sieve beds like beads on a string would allow for each sieve bed to be optimized for its target gas. Overall volume of the sieve bed could be tailored as well as the type of sieve, sieve volume and product void space.

Staged Pressurization

In the above configuration, it would be possible to place a pump at each sieve bed inlet. This may decrease the pressure drop across the sieve bed and be more electrically efficient. It would also allow for independent working pressures at each stage of separation.

Variable Product Void Space

In one variation the PVS is made adjustable using a screw to allow for precise tuning of the sieve bed ratio. In another variation a sensor monitors a fluctuating inlet gas concentration and adjusts a piston (or other positive displacement device), which adjusts the PVS such that at the end of a pressurization stage the sieve bed has dynamically adjusted itself to the ideal PVS to Sieve Space ratio.

Instrumentation, controls, feeders, tanks, fittings, valves, and other auxiliary appurtenant equipment are to be provided where necessary, desirable, or convenient in conventional fashion. Materials of construction are conventional for the materials being handled and the pressures/temperatures expected in the process and where corrosion or erosion is expected. Insulation is to be provided where necessary for maintaining temperature and conserving energy. Various of the tanks and lines illustrated can be in multiple, series, cascade, or parallel connected for additional treating time or capacity.

While the invention has been described with reference to various embodiments, those skilled in the art will understand that various changes may be made and equivalents may be substituted for elements thereof without departing from the scope and essence of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. In this application all units are in the metric system and all amounts and percentages are by weight, unless otherwise expressly indicated. Also, all citations referred herein are expressly incorporated herein by reference.

We claim:

1. A gas concentrator apparatus for enriching a product gas concentration in a gas, the apparatus comprising:
a pressure differential member,
an air-tight first chamber having a hollow first product end and an adjacent first feed end containing molecular sieve material for adsorbing a waste component gas, wherein said first feed end is separated from said first product end by a gas-permeable first boundary member,
a second air-tight chamber having a hollow second product end and an adjacent second feed end containing molecular sieve material for adsorbing the waste component gas, wherein said second feed end is separated from said second product end by a gas-permeable second boundary member,
wherein said first feed end is in fluid communication with said pressure differential member through a first gas infeed conduit, and wherein said second feed end is in fluid communication with said pressure differential member through a second gas infeed conduit, and wherein a second gas conduit connects in fluid communication with, and selectively between, said first and second product ends, and wherein a third gas conduit cooperates in fluid communication between and to said first and second gas permeable boundary members, and wherein said second gas conduit cooperates in fluid communication with an outfeed line for delivery of the product gas along said outfeed line to an end use, said first and second feed ends having, respectively, first and second exhaust ports for selectively venting said first and second feed ends,
a first valve for selective inflow of air from a compressor to either of said first or second feed ends, an exhaust valve for selective exhausting of gas from either said first or second feed ends, second valve for selective gas flow from said first or second product ends to said gas outfeed line for end use of the gas, and a third valve for selective gas flow between and to said first and second boundary members so that, when said valves are actuated in sequence, product gas enriched gas is generated alternatingly in said first and second chambers and fed sequentially for end use through said gas outfeed line,
a gas flow controller for controlling actuation of said valves to regulate gas flow through said conduits and said outfeed line so as to sequentially, in repeating cycles:
(a) prevent the gas from flowing between the first and second chamber and allow compressed air from said compressor into said first chamber during a first gas pressurization phase, wherein said first container is pressurized to a threshold pressure level to create a first enriched gas packet in said first product end having an incrementally enriched product gas concentration, and opening said second chamber exhaust valve means so as to expel the gaseous contents of said second chamber,
(b) prevent the gas from flowing between either of said first or second chambers and said compressor and allow a regulated amount of said first enriched gas packet to flow from said first product end into said second gas conduit for delivery of the product gas for the end use downstream along said second gas conduit and said outfeed line,
(c) prevent the gas from flowing between either of said first or second chambers and said compressor or between either of said chambers and said outfeed-line, and allow the first enriched gas packet to flow from said first boundary member to said second boundary member in said third gas conduit wherein the first enriched gas packet flows from a pressurized said first chamber to a lower pressure said second chamber,
(d) prevent the gas from flowing between said chambers and actuate said compressor to pressurize said second chamber to the threshold pressure level to create a second enriched gas packet and open said first exhaust valve means so as to expel to atmosphere the gaseous contents of said first chamber,
(e) prevent the gas from flowing between either of said chambers and said compressor and allow a regulated amount of the second enriched gas packet to flow from said second product end into said second gas conduit for delivery of the product component gas for the end use downstream along said second gas conduit and said outfeed line,
(f) prevent the gas from flowing between either of said chambers and said compressor or between either of said chambers and said outfeed valve, and allow the second enriched gas packet to flow between said first and second boundary members through said third gas conduit wherein the second enriched gas packet flows from a pressurized said second chamber to a lower pressure said first chamber.

2. The apparatus of claim 1 wherein said boundary members are gas diffusers.

3. The apparatus of claim 2 wherein said third conduit has opposite first and second open ends, said first and second open ends having corresponding first and second apertures therein, and wherein said first and second apertures are adjacent and spaced from, respectively, said first and second boundary members.

4. The apparatus of claim 3 wherein said first and second apertures are substantially parallel to, respectively, said first and second boundary members.

5. The apparatus of claim 4 wherein said second conduit is a tube.

6. The apparatus of claim 2 further comprising first and second infeed gas diffusers mounted adjacent, respectively, said first and second gas infeed conduits so as to diffuse gas fed into said first and second feed ends through said first and second gas infeed conduits, whereby said molecular sieve material is sandwiched, respectively, between first boundary member and said first infeed gas diffuser, and between said second boundary member and said second infeed gas diffuser.

7. The apparatus of claim 6 wherein said third conduit has opposite first and second open ends, said first and second open ends having corresponding first and second apertures therein, and wherein said first and second apertures are adjacent and spaced from, respectively, said first and second boundary members.

8. The apparatus of claim 7 further comprising first and second gas plenums, respectively, between said first gas infeed conduit and said first infeed gas diffuser, and between said second gas infeed conduit and said second infeed gas diffuser.

9. The apparatus of claim 8 further comprising first and second gas manifolds mounted respectively, adjacent and between said first end of said second conduit and said first boundary member, and adjacent and between said second end of said second conduit and said second boundary member.

10. The apparatus of claim 9 wherein said sieve material is zeolite, said product gas is oxygen, said waste component gas is nitrogen, and said pressure differential means includes a compressor.

* * * * *